United States Patent Office 3,845,199
Patented Oct. 29, 1974

3,845,199
PREPARATION OF BERYLLIUM HYDRIDE
Lawrence H. Shepherd, Jr., Baton Rouge, La., assignor to Ethyl Corporation, Richmond, Va.
No Drawing. Filed Dec. 20, 1965, Ser. No. 515,516
Int. Cl. C01b 6/00
U.S. Cl. 423—645         10 Claims This invention relates to the provision of a novel and improved method for the preparation of beryllium hydride. A considerable number and variety of methods have been reported in the technical and patent literature for the preparation of beryllium hydride. Most of these involve the pyrolysis, under a variety of operating conditions, of beryllium alkyls or of complex hydrides or solvates thereof. The beryllium alkyls which are raw materials for these processes are tedious and expensive to prepare.

It is therefore an object of this invention to provide a novel and efficient method for the preparation of beryllium hydride which will not be subject to the indicated disadvantages.

Another object of this invention is to provide a method for preparing beryllium hydride in high yield and purity and in an easily recoverable form.

A further object f this invention is to provide a method for preparing beryllium hydride wherein one reactant can be recycled for the sake of economy. Additional objects will appear hereinafter.

Accordingly, the process of the present invention comprises preparing beryllium hydride by reacting an anhydrous beryllium halide wherein the halogen has an atomic number from 17 to 53, inclusive, with an alkali metal trialkyl borohydride wherein the alkali metal has an atomic number from 3 to 55, inclusive, and each alkyl group contains from 1 to about 6 carbon atoms, inclusive, the reaction being carried out in the presence of a solvent for the beryllium halide, the produce a solid alkali metal halide and a dissolved beryllium intermediate, separating the alkali metal halide from the reaction system and thereafter pyrolyzing said intermediate to produce solid beryllium hydride reaction product. The foregoing process constitutes an embodiment of this invention.

Another embodiment of the present invention is the formation of beryllium hydride by reaction anhydrous beryllium chloride with a sodium trialkyl borohydride in the presence of a solvent for the beryllium chloride followed by removal of the sodium chloride by-product, pyrolysis of the resulting beryllium intermediate to produce solid beryllium hydride reaction product and recovery of the reaction product.

Still another embodiment of this invention is the formation of beryllium hydride by reacting anhydrous beryllium chloride with sodium triethyl borohydride in a solvent for the former, separating the solid sodium chloride by-product, pyrolyzing the resulting intermediate in the presence of xylene or other high-boiling chaser to produce solid beryllium hydride reaction product and recovering the reaction product.

Still other embodiments will appear hereinafter.

An outstanding feature of this invention is the economy of the process which it discloses. This economy arises first because the costly trialkylboron by-product can be recycled and treated with fresh alkali metal hydride to generate more alkali metal trialkyl borohydride reactant and, second, because of the ease of removal and disposal of the unwanted alkali metal halide by-product. Furthermore, the use of a soluble form of alkali metal hydride, namely, the alkali metal trialkyl borohydride, eliminates the trouble normally resulting from the presence of impurities when solid alkali metal hydride is used.

The invention will be more fully understood by reference to the following illustrative example in which all parts and percentages are by weight unless otherwise specified.

EXAMPLE

All the following operations were carried out under an atmosphere of dry nitrogen.

To 24.4 parts (0.2 mole) of sodium triethyl borohydride, a small amount of diethyl ether was added to reduce the viscosity of the borohydride. The resultant solution was added dropwise with stirring to a solution of 8.0 parts (0.1 mole) of anhydrous beryllium chloride in 107 parts of diethyl ether. The reaction mixture was stirred for an additional fifteen minutes at ambient temperature. Sodium chloride precipitated in approximately theoretical amount (11.9 parts) and was removed by filtration.

The filtrate containing beryllium triethyl borohydride was concentrated to about 40 percent of its initial volume by removal of ether under vacuum.

Xylene (220 parts) was heated to reflux and the concentrated filtrate was added dropwise thereto. Ether, xylene and triethylboron distilled from the reaction mixture. The temperature was not permitted to fall below 120° C. during the addition. After addition was complete, the temperature was again raised to the reflux point and a small amount of xylene was distilled out.

The reaction mixture was then cooled to ambient temperature and beryllium hydride product was separated by filtration, washed with pentane, and dried under vacuum.

The product analyzed (by gas evolution) 94.4 mole percent beryllium hydride, the impurity consisting almost entirely of triethylboron.

When the pyrolysis of the above Example was carried out in the absence of a high-boiling solvent, similar results were obtained but the purity of the beryllium hydride product was sharply reduced. Similar results were likewise obtained (and with fairly comparable yield) when the xylene of the above Example was replaced with toluene, nonane, or dodecane.

The sodium triethyl borohydride employed as reactant in the above Example was prepared from sodium hydride and triethylboron by a method disclosed in the recent patent literature (Honeycutt, U.S. 3,055,943 and 3,055,944, Sept. 25, 1962).

A considerable variety of reactants can be employed in the process of the present invention. Thus the effective beryllium halides include the chloride, the bromide, and the iodide. However, for reasons of economy, the chloride is preferred.

With respect to the other reactant, the alkali metal trialkyl borohydride, any alkali metal having an atomic number from 3 to 55, inclusive, i.e., lithium, sodium, potassium, rubidium, or cesium may be employed. Again, for reasons for availability and economy, sodium and lithium derivatives are preferred. The alkyl radicals of the borohydride reactant may contain from 1 to about 6 carbon atoms, may be straight- or branched-chain radicals and may be alike or different. Of these alkyl radicals, the methyl, ethyl, propyl and butyl radicals and their isomers are preferred because of the ease of separation of the resulting boron alkyl by-products. Borohydride reactants containing alkyl radicals of higher molecular weight than that corresponding to $C_6$, or containing aryl radicals, are less satisfactory because of the high-boiling characteristics which they cause in the alkyl boron by-products and the consequent difficulty of separating by-products from the beryllium hydride product.

Normally, the reactants of this invention are combined in approximately stoichiometric proportions because such proportions lead to products of optimum purity. However, proportions ranging from a 100 percent or greater excess of the beryllium halide reactant to a 100 percent or greater excess of the alkali metal trialkyl borohydride reactant can be employed if desired.

The permissible reaction temperatures for the process of the present invention are largely a function of the solvent employed. Since, owing to the precipitation of the alkali metal halide by-product, the reaction proceeds smoothly and rapidly at ambient temperature, that temperature is preferred and low-boiling solvents may be employed. However by use of higher boiling solvents, higher reaction temperatures can be obtained. Thus diethyl ether, which boils at 35° C., is the solvent of choice, but higher boiling ethers ranging up to the isomeric dibutyl ethers may be employed if desired. Moreover, simple and mixed tertiary amines ranging from trimethyl amine to the isomeric tributyl amines may also be used. In each instance the limiting reaction temperature is the reflux temperature of the solvent employed.

In no instance should the reaction temperature exceed about 200° C. because of consequent incipient pyrolysis of the beryllium hydride product.

As indicated above, a high-boiling solvent or chaser may be used in the second or pyrolysis stage of the process of this invention. The use of such a chaser has the advantage that it improves control of the pyrolysis temperature. Such use represents a preferred embodiment of this invention.

Any compounds can be used as chasers which are inert with respect to reactants and products and which are liquid within the desired range, namely, from about 140 to about 200° C. or above. High-boiling aliphatic, cycloaliphatic and aromatic hydrocarbons have been found to be satisfactory. Examples of such hydrocarbons include n-nonane, 3-methylnonane, n-decane, cyclooctane, cyclononane, toluene, xylene, mesitylene, durene, cumene, pseudocumene, para-cymene, tetralin, kerosene and Stoddard solvent. The use of hydrocarbons of the type illustrated by these examples is particularly desirable because, when the hydrocarbons are heated, beryllium hydride precipitates out as rapidly as formed and is thereby separated from the reaction. The first or intermediate formation stage of the process of this invention is normally carried out at atmospheric pressure and this pressure is preferred because of the ease of manipulation associated therewith. However, pressures ranging from one-tenth atmosphere or less to ten atmospheres or more can be used if associated with solvents which are liquid within the desired range at the pressure in use. In the pyrolysis stage a reduced pressure is normally employed to assist in removal of the trialkylboron by-product. Such pressures can range from about 0.001 to about 760 millimeters of mercury depending in part on the particular alkyl boron compound employed. Pressures in the range of about 0.1 to about 50 millimeters of mercury are preferred because pressures in this range favor easy removal of the by-product boron alkyl.

Usually the alkali metal trialkyl borohydride is added to the beryllium halide reactant but the latter can equally well be added to the former; the order of addition is immaterial.

In general the reactions of the invention proceed smoothly and rapidly. Therefore the rate of combination of reactants is limited only by reflux of the solvent and the capacity of the condenser. Normally, incremental addition satisfies this limitation.

The reactions of the invention may be carried out under any atmosphere inert to both reactants and products. The use of dry nitrogen is preferred because of its availability and economy. Other suitable protective atmospheres include gaseous saturated hydrocarbons such as methane and ethane and the noble gases helium, neon, argon, krypton, and xenon.

The beryllium hydride obtained by the process of this invention is a valuable component of jet and rocket fuels. It is also useful as a source of storable hydrogen. It can be used for the metal plating of suitable substrates by thermal decomposition under appropriate conditions in contact with said substrates and it is useful as a source (by thermal decomposition) of pure metallic beryllium for use in alloys and as a chemical raw material.

What is claimed is:

1. Process for the preparation of beryllium hydride which comprises, in the first stage, reacting an anhydrous beryllium halide wherein the halogen has an atomic number from 17 to 53, inclusive, with an alkali metal trialkyl borohydride wherein the alkali metal has an atomic number from 3 to 55, inclusive, and each alkyl group contains from 1 to about 6 carbon atoms, inclusive, the reaction being carried out in the presence of a solvent for the beryllium halide to produce solid alkali metal halide and a dissolved beryllium intermediate and, in the second stage, separating said alkali metal halide from the reaction system, and thereafter pyrolyzing said intermediate to produce beryllium hydride.

2. The process of Claim 1 wherein said pyrolysis is conducted in a high-boiling chaser.

3. Process for the preparation of beryllium hydride which comprises, in the first stage, reacting an anhydrous beryllium halide wherein the halogen has an atomic number from 17 to 53, inclusive, with an alkali metal trialkyl borohydride wherein the alkali metal has an atomic number from 3 to 55, inclusive, and each alkyl group contains from 1 to about 6 carbon atoms, inclusive, the reaction being carried out in the presence of a solvent for the beryllium halide to produce solid alkali metal halide and a dissolved beryllium intermediate and, in the second stage, separating from the reaction system said alkali metal halide and at least a portion of said solvent, combining a high-boiling chaser with the resultant intermediate and pyrolyzing said intermediate while in admixture with said chaser to produce beryllium hydride, both of said stages being carried out under an atmosphere inert to both reactants and products.

4. The process of Claim 3 wherein the chaser is a high-boiling hydrocarbon, whereby beryllium hydride is produced in a readily recoverable form.

5. The process of Claim 3 wherein the beryllium hydride so produced is recovered from said chaser.

6. The process of Claim 3 wherein the alkali metal trialkyl borohydride is sodium triethyl borohydride and wherein the beryllium halide is beryllium chloride.

7. The process of Claim 3 wherein said solvent is selected from the group consisting of dialkyl ethers and trialkyl amines, each alkyl group containing from 1 to about 4 carbon atoms, inclusive.

8. The process of Claim 3 wherein said solvent is diethyl ether.

9. The process of Claim 3 wherein said chaser is xylene.

10. The process of Claim 3 wherein said beryllium halide is beryllium chloride, said alkali metal trialkyl borohydride is sodium triethyl borohydride and said solvent is a dialkyl ether in which each alkyl group contains from 1 to about 4 carbon atoms, inclusive, and wherein said high-boiling chaser is a liquid hydrocarbon selected from the group consisting of aliphatic, cycloaliphatic and aromatic hydrocarbons which have boiling points, at atmospheric pressure, ranging from below 140° to above 200° C.

References Cited

Head et al., J. Am. Chem. Soc., Vol. 79, pp. 3687–9 (1957) QD 1 A5.

Everest, The Chemistry of Beryllium, Vol. 1, Elsevier Pub. Co., New York, 1964, p. 82, QD181 B4 E9.

LELAND A. SEBASTIAN, Primary Examiner

U.S. Cl. X.R.

149—109